May 21, 1929.  F. ARZT ET AL  1,714,119
HEEL ACCELERATOR FOR MOTOR VEHICLES
Filed Feb. 9, 1928
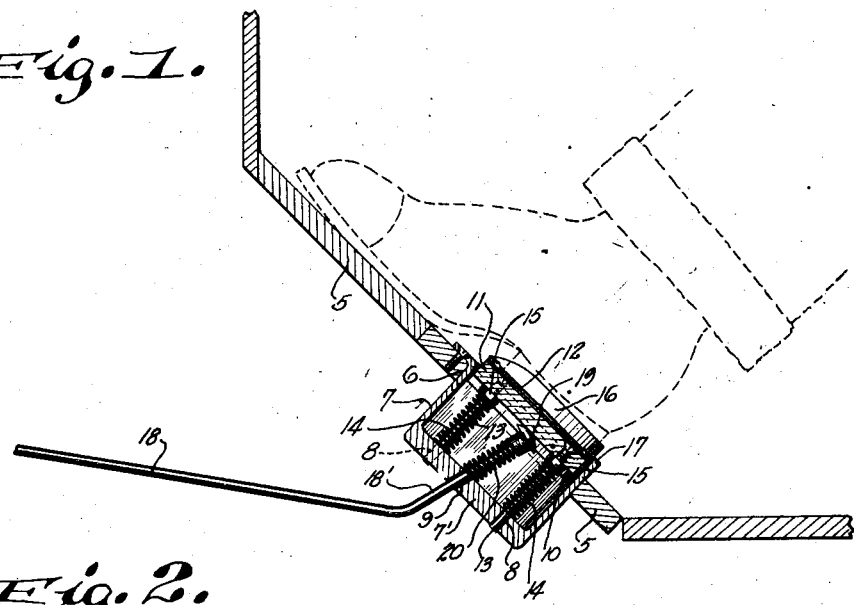
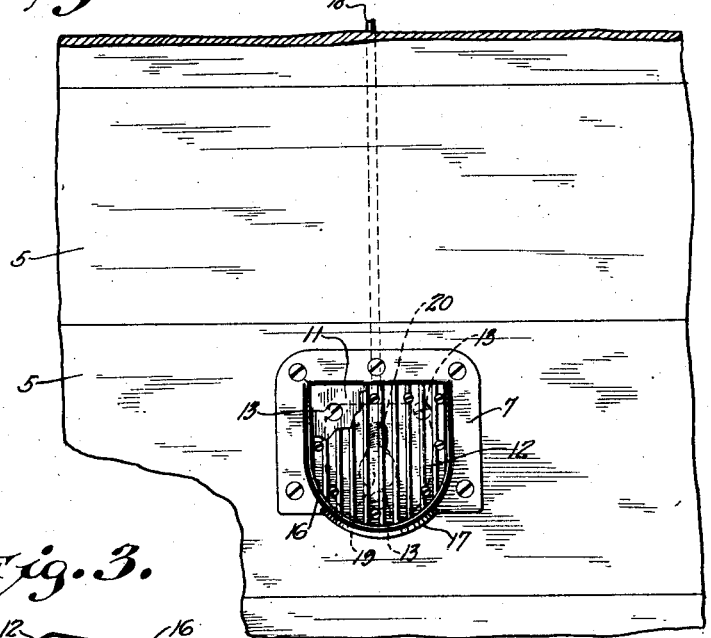
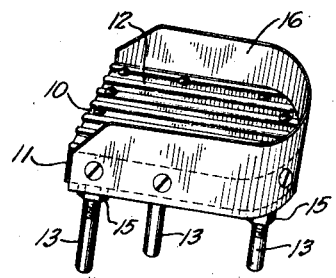
INVENTOR.
Frank Arzt 2nd
BY Frank J. Fischer
Morsell, Meeney, Morsell
ATTORNEYS.

Patented May 21, 1929.

1,714,119

UNITED STATES PATENT OFFICE.

FRANK ARZT AND FRANK J. FISCHER, OF JANESVILLE, WISCONSIN.

HEEL ACCELERATOR FOR MOTOR VEHICLES.

Application filed February 9, 1928. Serial No. 253,088.

This invention relates to improvements in heel accelerators for motor vehicles.

It is the primary object of the present invention to provide a heel actuated controlling pedal for motor vehicle carburetor valves, adding to the comfort of the driver by requiring a heel pressure for the feeding of fuel, rather than a toe pressure, as is now common, it being found that in long periods of vehicle driving a heel pressure is less tedious to the driver than a toe pressure, and permits a more natural position and relaxation of the driver's leg.

A further object of the invention is to provide a heel accelerator for motor vehicles consisting of a pedal forming a yieldingly mounted cut-out portion of a floor board of a vehicle.

A further object of the invention is to provide a heel accelerator which does not in any way interfere with the disposition and removal of the vehicle floor boards.

A further object of the invention is to provide a heel accelerator with which any form of motor vehicle may be readily equipped with a minimum amount of modification.

A further object of the invention is to provide a heel accelerator for motor vehicles which is of very simple construction, is inexpensive to manufacture and install, is effective in its operation, and is well adapted for the purposes described.

With the above and other objects in view the invention consists of the improved heel accelerator for motor vehicles, and its parts and combinations, as set forth in the claims, and all equivalents thereof.

In the accompanying drawing in which the same reference characters indicate the same parts in all of the views:

Fig. 1 is a vertical sectional view through the floor board portion of a motor vehicle showing the heel accelerator mounted therein, the latter being shown in section;

Fig. 2 is a plan view similar to Fig. 1 with a portion of the pedal broken away; and Fig. 3 is a detail perspective view of the heel accelerator pedal.

Referring now more particularly to the drawings, it will appear that the numeral 5 indicates the inclined floor boards of a motor vehicle and the lowermost of said floor boards, adjacent the driver's position, is formed with a U-shaped opening 6. Secured within said opening and depending therebelow is a U-shaped cupped member 7 provided in its base portion 7' with three triangularly arranged apertures 8 and a central aperture 9.

Fitted within the floor board opening 6 and adapted to close the same and to move with respect to the cupped member 7 is a U-shaped heel pedal 10 comprising a body portion 11 covered on its top surface with a layer of ribbed material 12, such as rubber or the like. Depending from said pedal are three triangularly disposed shanks 13 which slidably extend at their lower end portions into the apertures 8. Coiled springs 14 surround said shanks between the base portion 7' and nuts or lugs 15 on the upper portions of the shanks and the pedal is normally yieldingly supported thereby in a position slightly above the top surface of the floor boards 5, as shown in Fig. 1. A portion of the edge of the pedal is surrounded by a U-shaped collar 16 which projects both above and below said pedal. Also the rear upper portion of the cupped member 7 is provided with an upwardly projecting guide flange 17.

The upper angular end portion 18' of a carburetor valve control rod 18 is slidably extended through the central aperture 9 in the bottom portion of the cupped member 7. The end portion of the rod portion 18' has threaded thereonto a knob or cap 19 which engages the under surface of the pedal. That portion of the rod within the cupped member is surrounded by a coiled spring 20. Hence, when the pedal is yieldingly depressed, the carburetor rod is yieldingly moved longitudinally to operate the carburetor valve and when pressure on the pedal is released, the springs 14 will return it to normal raised position, and the spring 20 will likewise move the carburetor rod to normal position, closing the carburetor valve.

The use of the device is quite obvious from Fig. 1, it being seen that the pedal receives the heel portion of a foot and a heel pressure serves to operate the pedal accelerator.

From the foregoing description it will appear that the improved heel accelerator for motor vehicles is of simple and novel construction, and is well adapted for the purpose set forth.

What is claimed as the invention is:

1. The combination with the inclined floor boards of a motor vehicle, the lowermost of said floor boards having a U-shaped opening therein, of a cupped member depending from said opening, a U-shaped heel pedal closing said opening and movable within said cupped member, guide shanks carried by said pedal and slidably engaging said cupped member, springs about said guide shanks, a collar surrounding a portion of the pedal, a carburetor control rod slidably extending into said cupped member and engaging said pedal, and a spring about the confined portion of said control rod.

2. The combination with the inclined floor boards of a motor vehicle, one of said boards having an opening therein, of a cupped member depending from said opening, a pedal closing said opening and lying within the plane of said floor boards and movable within said cupped member, guide members carried by said pedal and slidably engaging said cupped member, springs about said guide members, a carburetor control rod slidably extending into said cupped member and engaging at its end portion the bottom surface of said pedal, and a spring about the confined portion of said control rod.

In testimony whereof, we affix our signatures.

FRANK ARZT.
FRANK J. FISCHER.